United States Patent [19]

Hughes

[11] Patent Number: 4,641,325

[45] Date of Patent: Feb. 3, 1987

[54] RECEIVER FOR PHASE SHIFT MODULATED CARRIER SIGNALS

[75] Inventor: William C. Hughes, Scotia, N.Y.

[73] Assignee: General Electric Company, Schenectady, N.Y.

[21] Appl. No.: 697,994

[22] Filed: Feb. 4, 1985

[51] Int. Cl.[4] .......................................... H04L 27/06
[52] U.S. Cl. ................................... 375/97; 375/119; 331/1 A; 328/155
[58] Field of Search ................. 375/97, 112, 120, 119, 375/118; 331/1 A; 328/14, 155; 377/47, 50

[56] References Cited

U.S. PATENT DOCUMENTS

| 4,011,516 | 3/1977 | Heimbigner et al. | 377/50 |
| 4,458,214 | 7/1984 | Lakomy | 331/1 A |

Primary Examiner—Robert L. Griffin
Assistant Examiner—M. Huseman
Attorney, Agent, or Firm—Bernard J. Lacomis; James C. Davis, Jr.

[57] ABSTRACT

Method and apparatus are disclosed for providing a local oscillator signal which is in phase and frequency synchronism with a carrier signal wherein the frequency of the carrier is a constant multiple of the frequency of a reference waveform. A phase detector detects the phase of the local oscillator relative to the carrier and provides a signal to a microprocessor indicative of this phase. The microprocessor provides the local oscillator and responds to a reference waveform threshold detector to determine the number of local oscillator pulses provided during one cycle of the reference and to maintain this number to equal the constant multiple. The microprocessor further responds to the phase detector to adjust the phase of the local oscillator and thereby maintain phase synchronism with the carrier.

9 Claims, 9 Drawing Figures

I/P FILTER 204

FIG. 9

STATE COUNTER

| STATE | ACTION | PS | No. COUNTS |
|---|---|---|---|
| 0 | $b_1, b_2$ = LOGIC ONE; DELAY; READ DATA AND L.O. PHASE DEVIATION | 192 | 64 |
| 1 | $b_1, b_2$ = LOGIC ZERO ADJUST L.O. PHASE AND BAUD PHASE | 173, 205 OR 189 | 83, 51 67 |
| 2 | | 186 | 70 |
| 4 | | 190 | 66 |
| 9 | | 190 | 66 |
| 14 | | 190 | 66 |
| 19 | | 190 | 66 |
| 20 | $b_1, b_3$ = LOGIC ONE; DELAY; READ BAUD PHASE DEVIATION | 192 | 64 |
| 21 | $b_1, b_3$ = LOGIC ZERO | 189 | 67 |
| 22 | | 186 | 70 |
| 24 | | 190 | 66 |
| 29 | | 190 | 66 |
| 34 | | 190 | 66 |
| 39 | | 190 | 66 |
| | | | 930 |

FOR ALL STATES NOT LISTED PRESET VALUE = 189 (COUNT = 67)

RECEIVER FOR PHASE SHIFT MODULATED CARRIER SIGNALS

BACKGROUND OF THE INVENTION

The present invention is directed in general toward method and apparatus for recovering a digital data signal which has been phase shift modulated onto a carrier signal and, more particularly, toward method and apparatus which advantageously uses a microprocessor to synchronize the operation of a phase shift demodulator.

Transmission of digital data by varying a characteristic of an alternating current (AC) carrier signal, such as its amplitude, phase or frequency, commonly referred to as amplitude, phase and frequency modulation, respectively, is widely practiced. Intrinsic to this mode of communication is the need to establish appropriate timing signals at the receiver. For synchronous detection, a local oscillator signal, which is in phase with the received carrier signal is necessary. A local baud signal, which is in phase with the received data units, is also necessary.

Many prior art methods rely primarily upon analog circuitry to provide the local oscillator and local baud signals. For example, U.S. Pat. No. 4,143,322 to Shimamura discloses a system for recovering a data signal which has been phase shift modulated onto a reference waveform wherein an analog locked loop is used to provide the local oscillator signal. Other prior art devices, such as that disclosed in U.S. Pat. No. 4,475,217 to Hughes, employ both digital and analog circuitry to provide the local oscillator and baud signals.

However, with the increasing availability and efficiency of micro-processing devices, it is becoming more and more desirble to employ these devices to perform receiver functions, e.g., to provide the local oscillator and baud signals. Further, many prior art receivers are used in applications where a microprocessor is available to perform functions in addition to those for which it is provided. See e.g., U.S. Pat. No. 4,335,303 to Phillips et al. (1982) and U.S. Pat. No. 4,230,913 to Brothers et al. (1980). In such cases, adapting an available microprocessor to provide the local oscillator and baud signals would allow for elimination of those devices now providing these signals.

It would be advantageous, therefore, if receivers such as the ones discussed above could be integrated with an available microprocessor to allow the microprocessor to provide the local oscillator and baud signals. This would result in improved reliability due to a decrease in the total number of components of the system. Further, such a device would prove less expensive to produce than prior art devices as the number of necessary discrete components would be reduced.

Additionally, by using a microprocessor to synchronize the receiver, more synchronization signals can be provided without the need to provide additional components to produce these signals. As a result, more sophisticated operation of the analog components and consequent increase in accuracy is possible without a consequent decrease in reliability or increase in production expense.

OBJECTS OF THE INVENTION

It is, therefore, an object of the present invention to provide a receiver for recovering data which has been phase shift modulated onto a carrier wherein the receiver advantageously employs an available microprocessor device to provide the local oscillator and baud signals.

It is a further object of the present invention to provide apparatus for recovering digital data from a phase shift modulated carrier which requires a lesser number of components than prior art receivers.

It is a still further object of the present invention to provide a more accurate and reliable receiver for recovering data from a phase shift modulated carrier.

It is a further object of the present invention to provide a method for synchronizing the operation of a phase shift demodulator which is particularly suitable for implementation in a microprocessor.

It is still a further object of the invention to achieve these advantages of simplification and increased reliability while at the same time maintaining excellent signal to random noise performance and rejection of noise at frequencies which are harmonics of the baud rate.

SUMMARY OF THE INVENTION

These and other objects of the invention are met by providing a receiver for recovering data from a phase shift modulated carrier, wherein the instantaneous frequency $f_0$ of the carrier is a constant multiple $k_c$ of the instananeous frequency $f_r$ of a reference waveform, and wherein the reference is known to have a lower limit frequency $f_{lr}$. The baud rate is also related to the reference frequency $f_r$. Particularly, the baud rate equals one half the reference frequency, i.e. $f_r/2$.

A microprocessor is adapted to provide a first oscillating signal of a frequency proportional to the lower limit reference frequency $f_{lr}$. The frequency of the first oscillating signal is divided by a first multiple $k_i$ to provide a second oscillating signal. The frequency of the second oscillating signal is divided by a second multiple $k_i'$ to provide the local oscillating signal. The frequency of the local oscillating signal is, therefore, a constant multiple of the lower limit reference frequency $f_{lr}$.

The microprocessor maintains the frequency of the local oscillator signal to be a constant multiple of the actual reference frequency by providing a plurality of local oscillator servo pulses and adding the servo pulses to the first oscillating signal. The number of servo pulses which are added during each cycle of the reference waveform is chosen such that the sum of servo pulses and first oscillating signal pulses during each cycle of the reference waveform will equal $k_i k_i' k_c$. Hence, the number of second oscillating pulses during each reference cycle will equal $k_i' k_c$ and the number of local oscillator pulses during each reference cycle will equal $k_c$.

The number of local oscillator servo pulses to be provided by the microprocessor is determined by counting the number $N_f$ of second oscillating pulses which occur during one cycle of the reference waveform. If the number of second oscillating pulses counted, i.e. $N_f$, is less than the number of pulses which should be counted, i.e. $k_i' k_c$, then the number of servo pulses to be added to the first oscillating signal is increased. Conversely, if the number of second oscillating pulses $N_f$ is greater than $k_i' k_c$, the number of servo pulses is decreased. It will be noted that in order to add one pulse to the second oscillating signal, $k_i$ servo pulses must be added to the first oscillating signal.

The microprocessor maintains the local oscillator signal in phase with the received carrier signal by sampling a local oscillator phase deviation signal during each baud period to determine whether the local oscillator leads or lags the received carrier. If the local oscillator leads the received carrier, one servo pulse is prevented from being added to the first oscillating signal, thereby retarding the phase of the local oscillator $360/k_ik_i'$ degrees. Conversely, where the local oscillator lags the received carrier, one additional servo pulse is added to the first oscillating signal, thereby advancing the phase of the local oscillator $360/k_ik_i'$ degrees. Steps are taken to insure that in any one reference waveform cycle where $k_i$ phase correction pulses are added to the first oscillating signal, one pulse is subtracted from the number of second oscillating signal pulses counted, thereby maintaining independence between the frequency and phase correction processes.

With the above described method, $k_i$ will determine how many pulses need be inhibited or added to the first oscillating signal to provide a proportional degree retard or advance of the local oscillator phase. As such, $k_i$ provides a sensitivity variable which determines the accuracy of phase lock.

To provide the local baud period, the baud period is divided into L states wherein the first state corresponds to the beginning of the baud period and wherein state L/2 corresponds to the middle of the baud period. The states are indexed by counting a predetermined number of second oscillating pulses between each state. Once every L states, the baud error signal is sampled to determine whether the local baud period leads or lags the received baud. Where the local baud leads the received baud, the number of second oscillating pulses counted during the baud period (to index the L states) is increased thereby delaying the local baud. Conversely, where the local baud lags the received baud, the number of second oscillating pulses counted during the baud period is decreased thereby advancing the local baud period.

A novel detector is provided which comprises a mixer for demodulating the received carrier and an integrate and dump filter for filtering the mixer output. To provide high immunity against coherent interference at frequencies which are harmonics of the baud rate, prior art integrate and dump filters require excess circuitry to insure that the filter can integrate while dumping thereby avoiding the loss of a portion of the integral during the dump time. The present method disables the filter input at two periods of equal duration chosen such that the integral of the coherent interference over the first period will be equal and opposite to the integral of the interference over the second period. Thus, the inability of the filter to integrate over either of these periods does not affect the rejection of this type of noise. The dump time of the filter is chosen to coincide with one of the aforementioned periods thereby eliminating the need for circuitry to insure that the filter integrates continuously.

BRIEF DESCRIPTION OF THE DRAWINGS

The subject matter which is regarded as invention is particularly pointed out in the claims appended hereto. However, the invention, both as to organization and method of practice, can best be understood by reference to the following detailed description taken in conjunction with the drawings in which:

FIG. 9 is a chart of values necessary to complete the method of the subject invention.

DETAILED DESCRIPTION OF THE INVENTION

The present invention provides a receiver for recovering data which has been phase shift modulated onto a carrier, wherein the instantaneous frequency of both the carrier signal and the baud rate is a constant multiple of the instantaneous frequency of the reference waveform. The receiver advantageously uses an available microprocessor to provide the necessary local oscillator and baud signals. As discussed hereinabove, the local oscillator is necessary to synchronize the operation of the detector circuit to the phase and frequency of the incoming carrier waveform. Likewise, the local baud is necessary to synchronize the detector to the phase and frequency of the data modulated on the carrier waveform.

Figure 1:
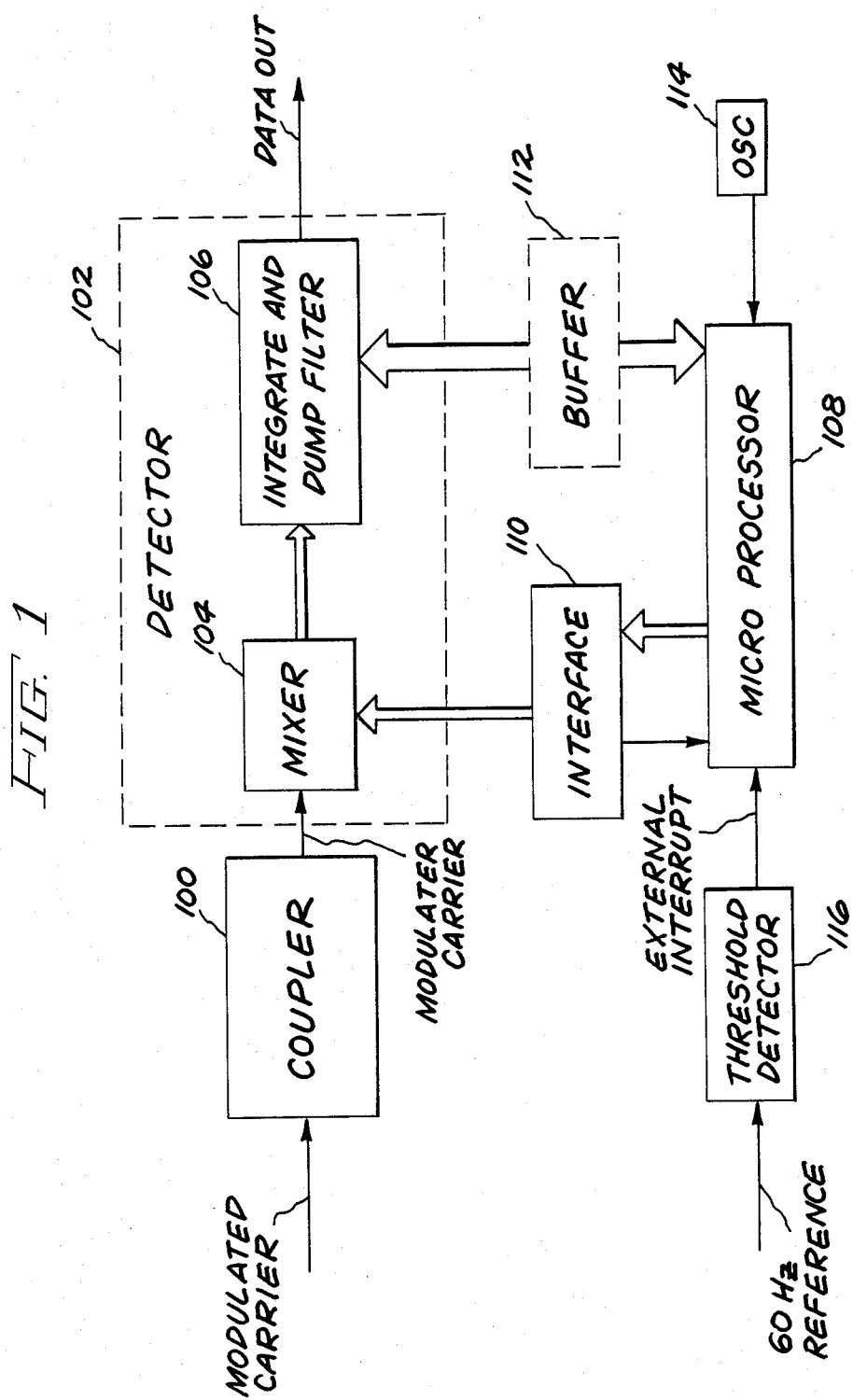
FIG. 1 is a block diagram of a receiver wherein a microprocessor is used to synchronize the local oscillator and baud signals of the detector circuit to the frequency and phase of the received modulated carrier signal.

As shown in FIG. 1, the receiver comprises a coupler 100 coupled to receiver the incoming modulated carrier and provides the modulated carrier signal to detector 102. Coupler 100 may comprise any known combination of elements capable of coupling the modulated carrier to detector 102. In the preferred embodiment, coupler 100 comprises a plurality of filters and amplifiers as is well known in the art.

Detector 102 is provided to recover the data from the modulated carrier. Detector 102 is also provided to detect the phase of the local oscillator and baud relative to the carrier and data, respectively. Detector circuitry 102 comprises a mixer 104, coupled to receive the carrier waveform, and an integrate and dump filter 106 for filtering the mixer output. Mixer 104 is coupled to microprocessor 108, via interface circuitry 110, for mixing the carrier with the local oscillator and a phase quadrature local oscillator to provide a data detect signal and a phase detect signal. Filter 106 is coupled to microprocessor 108 via buffer circuitry 112, and responsive to the microprocessor, for integrating the output of mixer 104 to provide the data signal, a local oscillator phase deviation, and a baud phase deviation signal.

Buffer circuitry 112 comprises that circuitry necessary to adapt data from microprocessor 108 for use in the analog circuitry of detector 102. Buffer circuitry 112 is shown in dotted lines in FIG. 1 as it may not be necessary to buffer the microprocessor signals. The decision to include buffers 112 can readily be determined by one skilled in the art after chosing the microprocessor and the detector devices as described below. Where buffer 112 is necessary, it can be chosen from any of a number of available buffers.

Interface 110 may also comprise buffers, in addition to other elements discussed in more detail below, for adapting signals from microprocessor 108 for use in the analog circuitry of detector 102.

Microprocessor 108 is coupled to receive a fixed frequency oscillating signal from oscillator 114. Oscillator 114 may comprise any of a number of known oscillators capable of providing a substantially fixed frequency oscillating signal to the microprocessor. In the preferred embodiment, oscillator 114 comprises a crystal oscillator adapted to provide a signal with a frequency of 4,800,206 Hz to microprocessor 108.

Microprocessor 108 is also shown coupled to the 60 Hz power line via threshold detector 116. While the present invention is described as a phase shift modulation receiver used in power line communications for remote meter reading applications, it is to be understood that the method and apparatus disclosed herein for providing synchronous local oscillator and baud signals can be used in any communications system wherein a reference frequency is available at both the transmitter and receiver, and wherein the instantaneous frequency of both the carrier and the baud is a constant multiple of the instantaneous frequency of the reference waveform. In the embodiment of FIG. 1, the reference waveform is the power line signal where $f_r = 60$ Hz, $f_{lr} = 59.9$ Hz and $k_c = 83.5$.

Threshold detector 116 provides an external interrupt upon each cycle of the 60 Hz. power line signal. Threshold detector 116 may comprise any of a number of available level detectors well known in the art. While it is not necessary that threshold detector 116 detect an exact voltage which the 60 Hz signal crosses, e.g. the zero crossing, it is necessary that detector 116 provide a signal to microprocessor 108 indicative of one cycle of the 60 Hz power line reference, i.e. it is essential that detector circuitry 116 provide a signal to microprocessor 108 at precisely the same point of each cycle of the 60 Hz power line reference.

Microprocessor 108 may comprise any of a number of programmable microprocessing devices for implementing the method described herein to provide a first oscillating signal, a servo signal and several local baud signals in response to the data signal, the local oscillator phase deviation signal and the baud phase deviation signal. In the preferred embodiment, microprocessor 108 comprises a microprocessor of the type available from the Intel Corporation as an 8049 microprocessor.

It will be appreciated by one of skill in the art that while the invention is described for use with a microprocessor requiring an external frequency generator, to wit, oscillator 114, it is possible to use other microprocessors which are not so limited. In those cases, oscillator 114 would be unnecessary.

Figure 2:
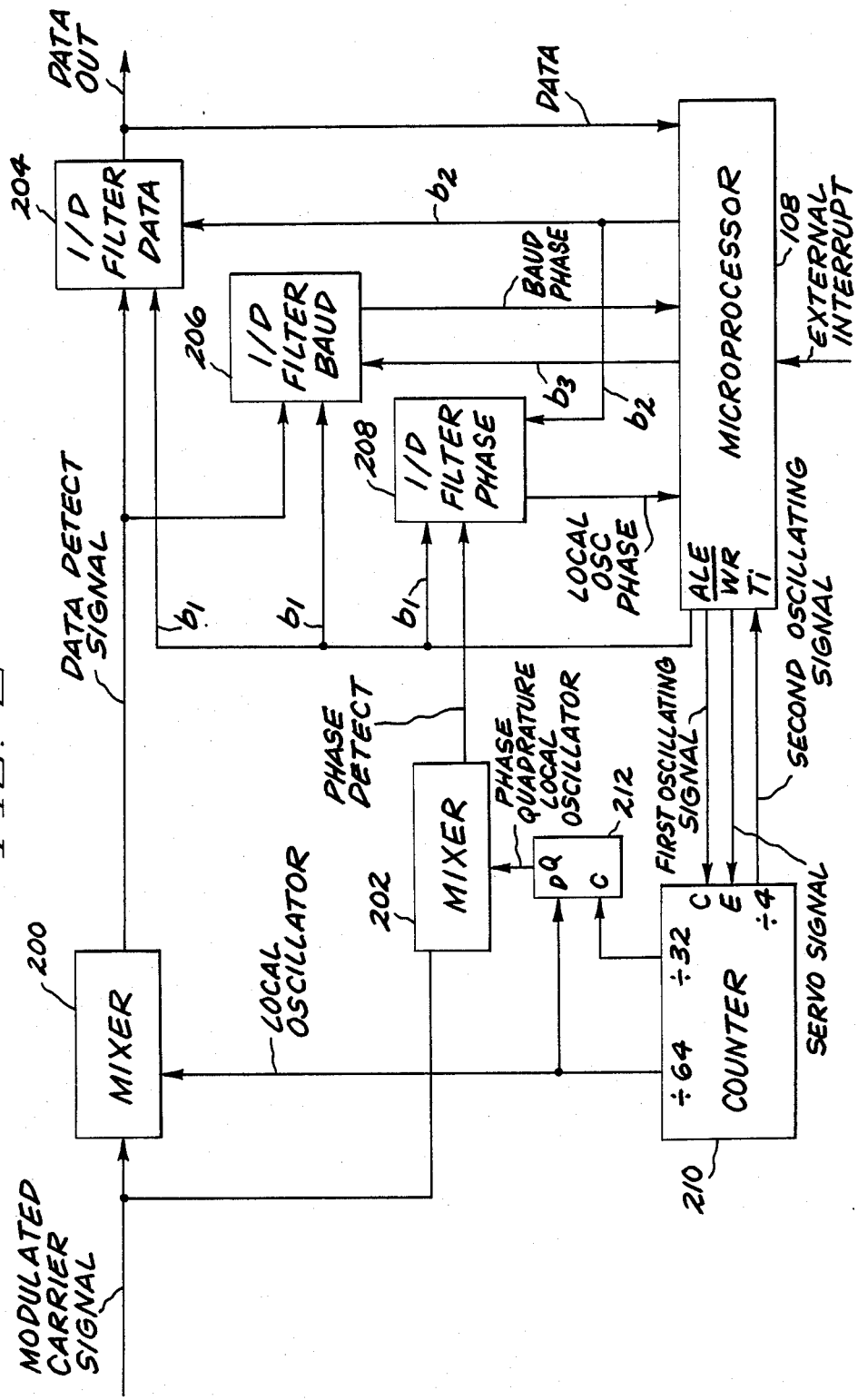
FIG. 2 is a more detailed block diagram of the detector circuitry and interface circuitry of FIG. 1.

With reference to FIG. 2, there is shown a more detailed block diagram of detector circuitry 102, interface circuitry 110 and their interconnections with microprocessor 108. Interface circuitry 110 comprises, in addition to the optional buffer circuitry discussed above, a counter 210 and a data flip-flop 212. Counter 210 is coupled to the ALE output of microprocessor 108 for receiving the first oscillating signal from the microprocessor. In the preferred embodiment, the frequency of the first oscillating signal is 320,014 Hz.

The enable input of counter 210 is coupled to the $\overline{Wr}$ output of microprocessor 108 for receiving the local oscillator servo signal. Configured in this manner, counter 210 will add the local oscillator servo pulses to the pulses of the first oscillating signal. Counter 210 is adapted to divide the frequency of this composite signal by a first multiple $k_i$ to provide the second oscillating signal to the $T_i$ input of the microprocessor. Counter 210 is further adapted to divide the frequency of the second oscillating signal by a second multiple $k_i'$ to provide the local oscillator signal.

In the preferred embodiment, the second oscillating signal is taken from the divide by four output of counter 210, and hence, $k_i = 4$. The local oscillator signal is taken from the divide by 64 output of counter 210, and hence, $k_i' = 16$. Therefore, the local oscillator frequency, absent the addition of any servo pulses, will be approximately 5000 Hz. This frequency represents the lower limit local oscillator frequency, i.e.:

$$5000 \text{ Hz} \approx k_c f_{lr} = (83.5)(59.9).$$

It will be appreciated by those skilled in the art that the average local oscillator frequency can be increased from its lower limit and governed to be a constant multiple $k_c$ of the instantaneous reference frequency $f_r$ simply by adding to the first oscillating signal the appropriate number of servo pulses.

Counter 210 may comprise any means for adding the pulses of the servo signal to the pulses of the first oscillating signal to provide a composite signal, for dividing the frequency of this composite signal by $k_i$ to provide the second oscillating signal, and for dividing the frequency of the second oscillating signal by $k_i'$ to provide the local oscillator. In the preferred embodiment, counter 210 comprises a modulo 64 counter available from the Motorola company as an MC14520.

Type D flip-flop 212 is coupled to receive the divide by 32 output of counter 210 at its clock input and coupled to receive the divide by 64 output of counter 210 at its data input. Configured in this manner, data flip-flop 212 will provide a signal at its non-inverted output which is in phase quadrature to the signal at its data input. Hence, the phase quadrature local oscillator is provided by the non-inverted output of flip-flop 212.

While counter 210 and D flip-flop 212 are each shown as discrete elements, it will be appreciated by those skilled in the art that either or both of these functions can in principle be implemented in the microprocessor, thereby eliminating the respective device. The present embodiment is preferred however, as it significantly reduces microprocessor computation time and hence frees the microprocessor to perform non-receiver related functions.

Mixer circuitry 104 comprises two mixers 200 and 202, each coupled to receive the carrier waveform supplied from coupler 100. Mixer 200 is provided to mix the local oscillator and the carrier to provide the data detect signal. Mixer 202 is provided to mix the phase quadrature local oscillator and the carrier to provide the phase detect signal. Each mixer operates by providing the carrier waveform as its output during intervals for which the local oscillator (the phase quadrature local oscillator in the case of mixer 202) is a logic one, and providing the inverse of the carrier as its output during the interval for which the local oscillator is a logic zero.

Figure 8:
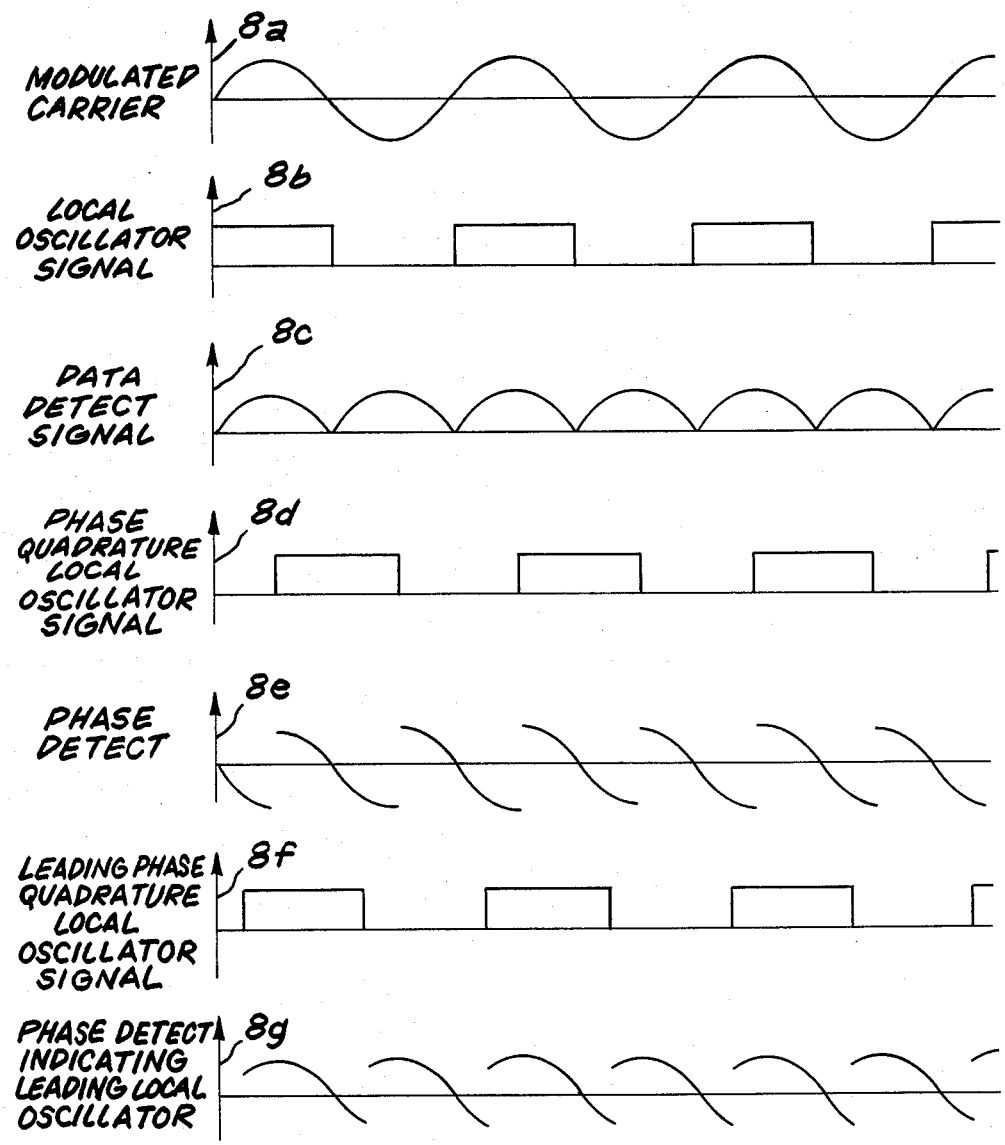
FIG. 8 contains a plurality of amplitude versus time graphs of several signals generated by the apparatus of FIG. 1.

The characteristics of the mixer output can best be described by reference to the amplitude versus time graphs of FIG. 8. FIG. 8a is a graph showing the change in amplitude versus time of the modulated carrier signal received at the input of mixer 200. It will be understood that the inverse of the carrier is simply an inverse of the graph shown in FIG. 8a. FIG. 8b is an amplitude versus time graph for the local oscillator signal supplied to mixer 200 from counter 210. For positive data values where the local oscillator is in phase with the carrier, the relative phases of the carrier and the local oscillator will be as shown in FIGS. 8a and 8b, and the output of mixer 200 will comprise a plurality of half sinusoids with positive peaks as shown in FIG. 8c. For negative data values where the local oscillator is in phase with the carrier, the phase of the carrier will be displaced 180° relative to the local oscillator and the half sinusoids will have negative peaks (not shown).

The phase quadrature local oscillator signal supplied to mixer 202 (FIG. 2) is graphed in FIG. 8d. For positive data values where the local oscillator is in phase with the carrier, the phase detect output of mixer 202 will have the amplitude versus time characteristics of the graph of FIG. 8e. It will be noted that the integration over any integral number of half sinusoids graphed in FIG. 8e will be equal to zero. Where the data value is negative and the local oscillator is in phase with the carrier, the half sinusoids will have a polarity opposite that shown in FIG. 8e and the integration over any integral number of half sinusoids will remain zero.

Mixers 200 and 202 may comprise any known combination of devices adapted to provide the data detect and phase detect signals as described above. Although mixers 200 and 202 are shown as devices separate from D flip-flop 212 and coupled to receive both the local oscillator and the phase quadrature local oscillator, it will be apparent to those skilled in the art that many modifications can be made to provide the data detect and phase detect signals. Particularly, it is possible to adapt mixer 200 and 202 as either one or two devices, coupled to receive only the local oscillator signal and provide therefrom the data detect and phase detect signals. Such modified mixers can be readily substituted for the preferred arrangement described herein.

Returning to FIG. 2, integrate and dump filter 106 is shown to comprise three filters 204, 206 and 208, each adapted to integrate their input during periods that the baud signals supplied from microprocessor 108 are a logic zero. Hence, filters 204–206 and 208 are each adapted to integrate the data detect signal during periods that a first integrate baud signal $b_1$ is zero to provide the data output, the local oscillator phase deviation signal and the baud phase deviation signal, respectively.

Figure 3:
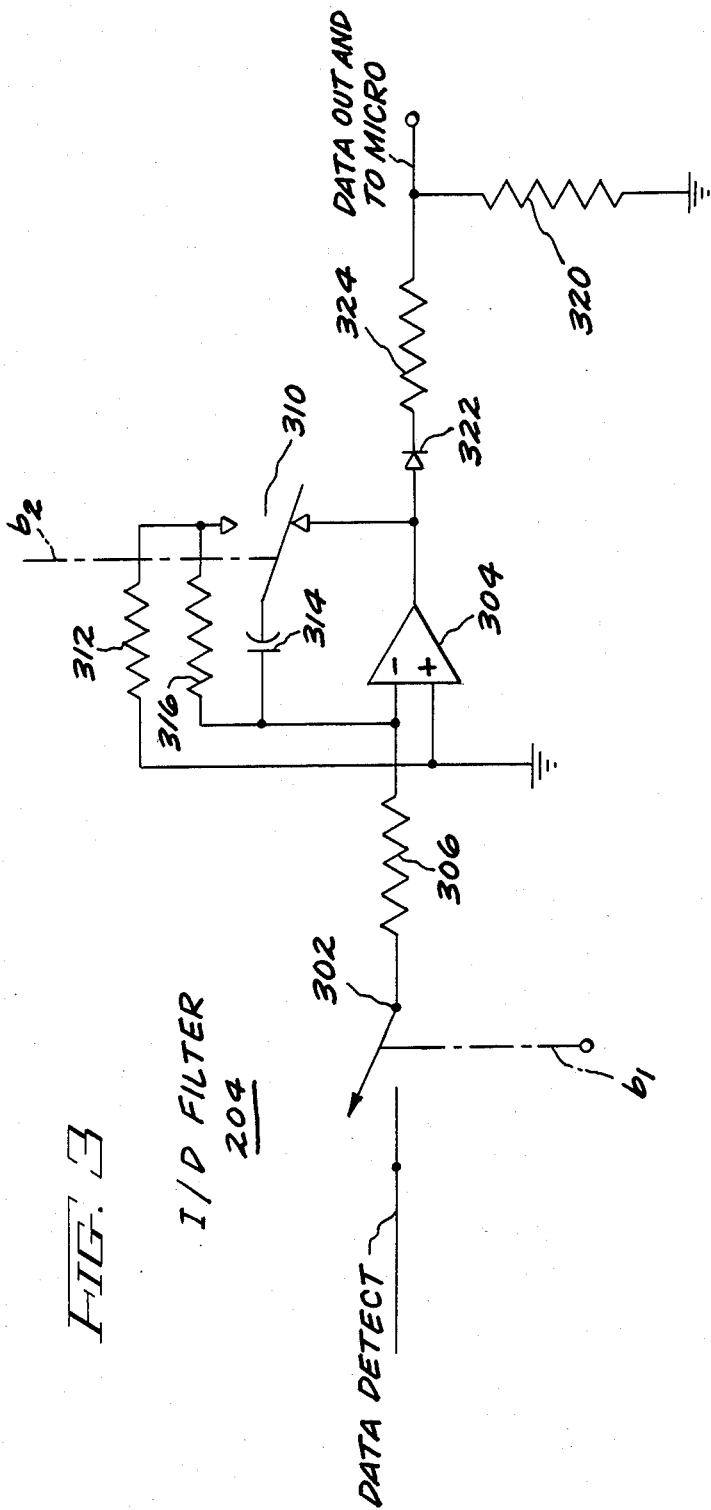
FIG. 3 is circuit diagram of a mixer and integrator of FIG. 2.

With reference to FIG. 3, there is provided a more detailed block diagram of integrate and dump filter 204. While only filter 204 is shown in FIG. 3, it is to be understood that filters 206 and 208 are configured and operate in a manner similar to that of filter 204.

Integrate and dump filter 204 is shown to comprise a switch 302 coupled to an operational amplifier 304 via a resistor 306. Switch 302 includes a control input coupled to receive the first integrate baud signal $b_1$. Switch 302 is adapted to be closed, i.e. in the position opposite that shown, and thus to couple the mixer output to the input of the operational amplifier during intervals that the baud signal $b_1$ is zero. Conversely, switch 302 is adapted to be open during intervals that baud signal $b_1$ is a logic one, and thus to provide no input to the operational amplifier.

The output of operational amplifier 304 is coupled to its inverted input via a capacitor 314 and a switch 310. Switch 310 includes a control input coupled to receive a second integrate baud signal $b_2$, also supplied from the microprocessor. During intervals that the baud signal $b_2$ is zero, switch 310 is in the position shown and the output of the operational amplifier is coupled to its inverted input via capacitor 314. During intervals that baud signal $b_2$ is one, switch 310 is in a position opposite that shown and the inverted input of the operational amplifier is coupled to ground via the parallel combination of capacitor 314 and a resistor 316, in series with a resistor 312.

In operation, the input to operational amplifier 304 is integrated between periods that the baud signal $b_2$, which controls the operation of switch 310 is a logic one. While switch 310 is in the position shown, the filter output voltage will increase for positive input voltages and decrease for negative input voltages. The integral of the voltage input will be stored as charge in capacitor 314. Where switch 310 is moved to the position opposite that shown, capacitor 314 will be coupled between the inverted and non-inverted inputs to the operational amplifier. Hence, where the operational amplifier output voltage is slightly positive just prior to the transition of the switches, it will become fully positive just after the transition thereby amplifying the result of the integration. Conversely, where the operational amplifier output is slightly negative just prior to the transition, it will become fully negative just after the transition.

Following the transition, the filter will be dumped, i.e. the charge stored upon capacitor 314 will be dissipated in resistor 316. Thus, both the inverting and the noninverting inputs to the operational amplifier will move toward zero and the output of the operational amplifier will likewise move toward zero.

Capacitor 314 and resistor 316 are chosen to provide a dump time which is long enough to allow the microprocessor to sample the amplifier output before it is dumped but short enough to allow the amplifier to resume integration as soon as possible. In the preferred embodiment, resistor 312 is 62 Kilohms, capacitor 314 is 0.2 mf and resistor 316 is 1 Kilohm, to provide a dump time of less than 1 millisecond.

Switches 302 and 310 may comprise any of a number of devices capable of performing the functions described above. In the preferred embodiment, switch 302 comprises a two position switch such as that available from the Motorola company as a MC14053 switch. Switch 3120 may comprise a three position switch such as that available from the Motorola company as a MC14053 switch.

The output of operational amplifier 304 is coupled to a resistor 320 via the series combination of diode 322 and resistor 324. The output of integrate and dump filter 204 is taken across resistor 320. Diode 322 and resistors 324 and 320 are provided to clip the operational amplifier output and adapt the voltage level of the output for use in the microprocessor.

As mentioned above, baud signal $b_1$ and baud signal $b_2$ cooperate such that filter error is substantially eliminated. Switch 310 transition from the position shown to its second position for a short interval at the end of each baud time. Switch 302 opens for precisely this same interval, removing the input from I&D filter 204 so that the charge polarity on capacitors 314 can be accurately determined. However, the short period of integration lost during the dump time, i.e. while $b_2$ is one, decrease the filter's immunity to coherent interference at frequencies which are harmonics of the baud rate. To remedy this, switch 302 opens for precisely the same interval of time at a point exactly one-half baud period; later thereby producing compensating errors in the integration of interfering waveforms which may be present in the received signal.

Similarly, baud signal $b_3$ is one for a short interval at precisely one half baud period later. Any error introduced in the output of filter 206 due to this period is compensated by the interval occurring at the end of the baud period when baud signal $b_1$ is one. Thus, two short periods of integration are slot in each baud period for each filter.

Integrate and dump filter 204 is adapted to integrate the data detect signal between intervals that baud signal $b_2$ is one to provide the data output. With reference to FIG. 8c, there is shown the data detect signal for positive data values where the local oscillator is in phase with the carrier. As mentioned above, the data detect signal will have negative peaks where the data values are negative. It will be apparent to those of skill in the art that the output of operational amplifier 304 will be fully positive at the end of the baud period where the integral of the data detect input is positive and, conversely, the output of operational amplifier 304 will be fully negative at the end of the baud period where the integral of the data detect input is negative. Accordingly, the clipped output of filter 204 (FIG. 2) will be a logic one for positive data values and a logic zero for negative data values.

Integrate and dump filter 208 (FIG. 2) is adapted to integrate the phase detect signal between periods that baud signal $b_2$ is a logic one, to provide a local oscillator phase deviation signal. This signal is indicative of whether the local oscillator leads or lags the carrier. The output of mixer 202 is graphed in FIG. 8e for the case where the local oscillator signal is in phase with the received carrier signal. Therein, the phase detect signal is shown to comprise a plurality of half sinusoids wherein the integration taken over an integral number of half sinusoids is equal to zero. However, where the local oscillator signal leads the received carrier signal, the phase quadrature local oscillator signal may have the characteristics as shown in FIG. 8f, relative to the modulated carrier of FIG. 8a. The output of mixer 202 will have the characteristics of the graph of FIG. 8g. The integration of this phase detect signal taken over an integral number of half sinusoids will be nonzero thereby indicating a leading or lagging local oscillator signal.

To determine whether the local oscillator leads or lags the received carrier, the data signal and the local oscillator phase deviation signal must be compared. Where the local oscillator phase deviation signal and the data signal are both logic one or logic zero, the local oscillator leads the received carrier. Conversely, where one is logic one and the other is not, the local oscillator lags the received carrier. Note that the comparison is between values existing just after the transition of the switches, as described above, and before the dump. Note also that while in theory a zero operational amplifier output (FIG. 3) would mean the local oscillator is in phase with the received carrier and a negative operational amplifier output would mean that the local oscillator is out of phase with the carrier, negative amplifier outputs are clipped to look like logic zero. Therefore, all logic zero filter outputs are assumed to result from negative operational amplifier outputs and, hence, the local oscillator and received carrier are always assumed to be out of phase. However, the effect of this assumption on the accuracy of phase lock is negligible.

Filter 206 is adapted to integrate the data detect signal between periods that baud signal $b_3$ is one to provide the baud phase deviation signal. Baud signal $b_3$ is one for a short duration intermediate the received baud period. Thus, where the data signal has undergone a positive to negative transition and the local baud period is in phase with the received baud, the output of filter 206 will be zero. It will be apparent to those skilled in the art that after integrating the data detect signal intermediate two baud periods, wherein the state of the data output changes from the first period to the second, a nonzero integral of the data detect signal represents a leading or lagging local baud.

As in the case of the local oscillator phase, it is necessary to compare the baud phase deviation signal to the data signal to determine whether the local baud period leads or lags the received baud. Where the two signals are both one or both zero, the local baud leads the received baud and, conversely, where one signal is one and the other is not, the local baud lags the received baud. As indicated above, the baud error integral is indicative of the status of the local baud period only where the data signal undergoes a transition between logic zero and logic one. Note that the data to be compared with the state of the baud phase deviation signal is the data bit after the transition as explained more fully below with reference to Figure F. Again, as in the case of the output of filter 204, note that non-zero filter output is assumed to indicate negative operational amplifier output, i.e. that the local baud is not in phase with the received baud, yet the effect on baud phase lock is negligible.

Microprocessor 108 receives the data signal from filter 204, the baud phase deviation signal from filter 206 and the local oscillator phase deviation signal from filter 208 and provides, in return, the first oscillating signal, the local oscillator servo pulses and the integrate baud signals $b_1$, $b_2$ and $b_3$. The method by which the microprocessor provides these outputs from its aforementioned inputs can best be described by reference to the decisional flow diagrams of FIGS. 4–7.

Generaly, microprocessor 108 counts the number $N_f$ of second oscillating signal pulses received from counter 210 during one cycle of the power line reference waveform and compares this value to the number of pulses which should be received, i.e. $k_f'k_c$. The second oscillating signal pulses $N_f$ are counted on a counter internal to the microprocessor, thereby allowing the microprocessor to attend to other functions extraneous to the receiver related functions discussed herein. The method by which the microprocessor provides its outputs, as described below, is initiated by receipt of an internal interrupt signal from this internal counter of the microprocessor or by receipt of an external interrupt signal from threshold detector 116 of FIG. 1.

Figure 4:
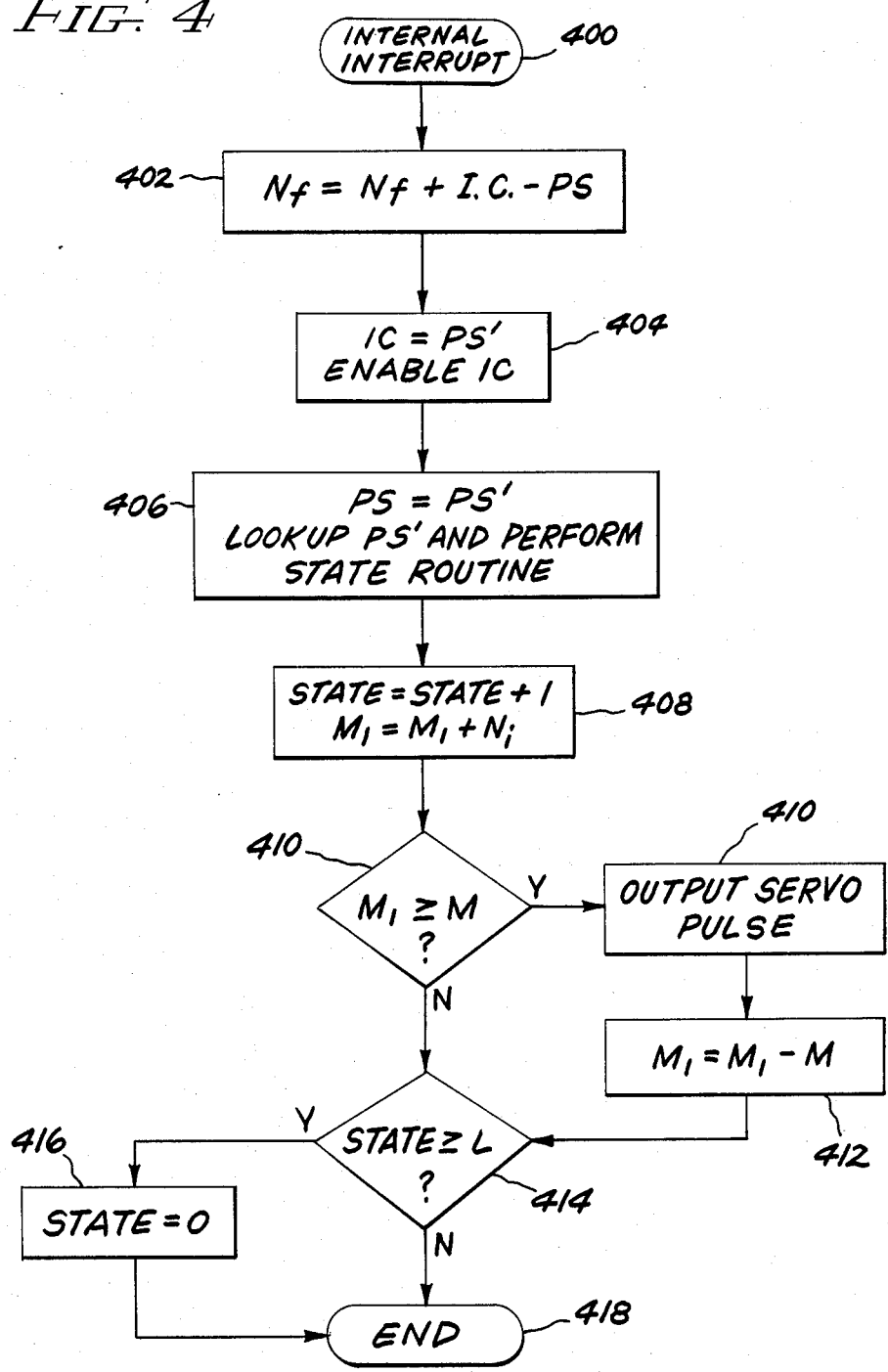
FIG. 4 is a decisional flow diagram illustrating several steps of the method of the subject invention taken to provide servo pulses and to index the baud states.

With reference to FIG. 4, several steps of the method of the subject invention are initiated in the microprocessor by receipt of an internal interrupt from the internal counter, step 400. The internal counter causes an interrupt each time it overflows. The number of second oscillating signal pulses received is computed after receiving the internal interrupt, step 402, by adding to the number already received $N_f$ the value IC of the internal counter, and subtracting a preset number PS.

The preset number PS is used to preset the internal counter such that the internal counter will count a predetermined number of pulses, approximately 60, between internal interrupts. Preset value PS is selected by consulting a lookup table such as the one shown in FIG. 9. For each state, wherein one state corresponds to an internal interrupt, the value PS to which the internal counter should be preset is given. The number of pulses which will be counted before the next internal interrupt is also shown. For each of the states not listed in FIG. 10, the preset value is equal to 189 and the number of pulses which will be counted before the next internal interrupt is 67.

By subtracting the preset number PS from the value IC of the internal counter, the microprocessor computes the number of pulses counted since the last internal interrupt. By adding this value to the number $N_f$ counted since the last external interrupt, the microprocessor accumulates the total number of second oscillating signal pulses received between external interrupts thereby indirectly determining the number of local oscillator pulses provided between external interrupts.

After computing the number of pulses $N_f$ counted, step 402, microprocessor 108 moves to step 404, where the internal counter is preset to the next preset value PS' and the internal counter is enabled. It is desirable that the number of pulses to which the internal counter must be preset be determined during the prior interrupt such that the internal counter can be preset and enabled as quickly as possible and thereby no incoming second frequency pulses will be missed. Thus, after enabling the internal counter, the microprocessor sets PS equal to PS', the value to which the internal counter was preset, and sets PS' to the value to which the internal counter will be preset during the next interrupt.

Also, during each state, a state routine is performed as determined by the lookup table of FIG. 9. Thus, during state 0, baud signals $b_1$ and $b_2$ undergo a transition from logic zero to logic one and the data and local oscillator phase deviation inputs are sampled. During state 1, baud signals $b_1$ and $b_2$ undergo a transition from logic one to logic zero and the routine is performed to adjust the local oscillator phase and the baud phase, described more fully hereinbelow with reference to FIGS. 6 and 7. In state 20, baud signals $b_1$ and $b_3$ undergo a transition to logic one and the baud phase deviation signal is sampled. In step 21, baud signals $b_1$ and $b_3$ undergo a transition to logic zero. In all other states, the only routine performed is to look up the preset value as discussed above.

It will be noted that in the preferred embodiment L=40, i.e. 0–39 states, wherein state 0 corresponds to the beginning of the local baud period and the end of the preceding baud period. Accordingly, state L/2, i.e. state 20, corresponds to the midpoint of the local baud period.

After performing the state routine, step 406, microprocessor 108 moves to step 408 wherein the state counter is incremented by one and the output counter $M_1$ is incremented by the pulse correction variable $N_i$. The pulse correction variable $N_i$ is a variable used in conjunction with the output counter $M_1$ to provide the local oscillator servo pulses. The value of the pulse correction variable $N_i$ is related to the number of second oscillating signal pulses counted as discussed more fully below with reference to FIG. 5.

After adding $N_i$ to output pulse counter $M_1$, the microprocessor compares the pulse output counter $M_1$ to an index value M, step 410. Where the value of the output counter $M_1$ is greater than index value M, a servo pulse will be output and the output pulse counter $M_1$ will be decreased by the index value M, step 412. Where the value of the output counter $M_1$ is less than index value M or where the pulse has been output and the output counter corrected in step 412, microprocessor 108 moves to step 414.

The choice for M will effect the frequency range over which the reference frequency $f_r$ can be accommodated. If M is chosen to be larger than the maximum possible value of $N_i$, the maximum value of $f_r$ which can be accommodated will be reduced. If M is chosen to be less than $N_i$ maximum, the maximum $f_r$ value which can be accommodated will be increased (provided the logic of FIG. 4 is changed so that an additional servo pulse is output each time it is found that $M_1 - M \geq M$ in step 412). In the preferred embodiment, M is chosen to be equal to $N_i$ maximum or 256 thereby requiring 256 correction pulses to be accumulated before a servo pulse will be output.

In step 414, the state is compared to the total number of chosen states L to determine whether the state variable should be reset to zero. If the state is equal to or greater than L, the microprocessor will execute step 416 and reset the state variable to zero. After the state variable has been reset to zero, or where the state variable is less than the chosen number of states L, microprocessor 108 will move to step 418 which represents the end of the internal interrupt process.

Thus, during each internal interrupt, the number of second oscillating pulses counted between interrupts is determined, the internal counter is reset, a state routine is performed, the state variable is increased, the pulse correction variable is increased and a servo pulse is added to the first oscillating signal where necessary.

Figure 5:
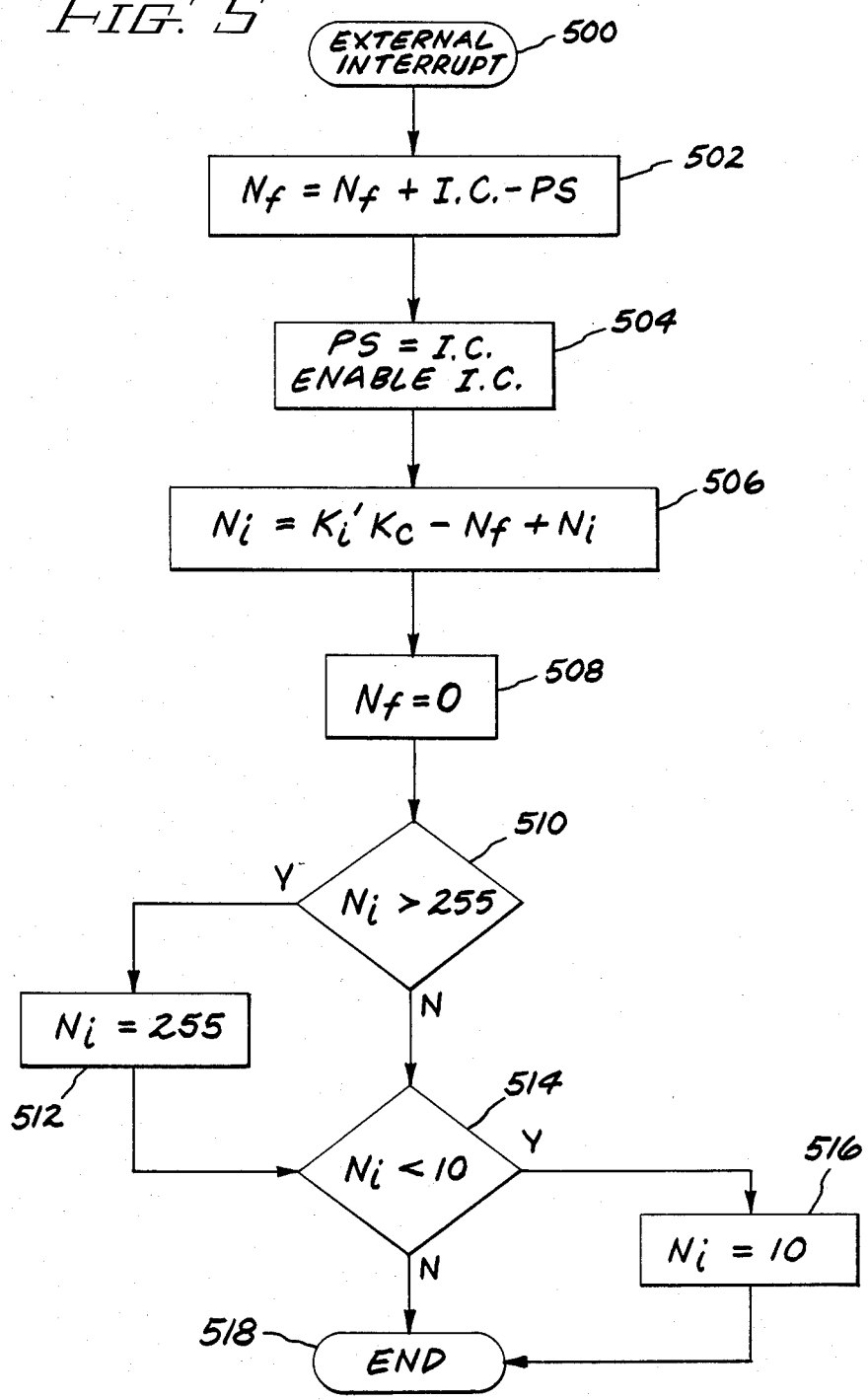
FIG. 5 is a decisional flow diagram illustrating several steps of the subject method taken upon each cycle of the reference waveform.

The process performed by the microprocessor during each external interrupt can best be described by reference to FIG. 5. The steps of the subject method illustrated therein are initiated by receipt of an external interrupt from threshold detector 116 (FIG. 1), step 500. The number of pulses counted in the internal counter since the last internal interrupt is determined by adding the value of the internal counter IC to the number previously counted $N_f$ and subtracting therefrom the value PS to which the internal counter was preset, step 502. Again, in order to insure that the correct pulse count is obtained in $N_f$ over the next cycle of the reference frequency, PS is immediately set to IC, step 504. It should be noted that by setting the preset value PS to the value of the internal counter IC, the internal counter can continue to count to the next internal interrupt and, at that point, by subtracting the preset value PS from the internal counter value IC, the number of pulses counted since the external interrupt will be known.

In step 506, correction variable $N_i$ is computed by subtracting from the number of second oscillating pulses which should be received $k_i'k_c$ the number of pulses which were received $N_f$ and adding thereto the prior value of the correction variable $N_i$. Since the correction variable is never reset, it represents a continuous negative algebraic sum of the number of excess second oscillating signal pulses (excess pulses being added negatively and a deficiency of pulses being added positively) i.e. $k_i'k_c - N_f$. Thus, if the local oscillator frequency is low for a period of time, $N_i$ will increase positively on each cycle through the external interrupt routine. Looking back to FIG. 4, it is apparent that, where the correction variable $N_i$ is a large fraction of the index pulse variable M, the output pulse counter $M_1$ will have large increases in relation to index variable M and a pulse will be output often during the internal interrupt routine. Likewise, where the pulse correction variable $N_i$ is small in comparison to the index variable M, the output pulse counter $M_1$ will increase in small amounts relative to index variable M and many internal interrupts will be required before $M_1$ will exceed the value of M and a pulse will be added.

Further, if the frequency of the second oscillating signal is less than the desired frequency, correction variable $N_i$ will be increasing, and thus more pulses will be added to the first oscillating signal. Conversely, where the second oscillating signal is running at a frequency higher than that desired, correction variable $N_i$ will be decreasing and less pulses will be added to the first oscillating signal. Correction variable $N_i$ will converge to an equilibrium value such that the appropriate number of servo pulses are added to the first oscillating signal to maintain the number of second oscillating signal pulses counted $N_f$ during one reference cycle, i.e. between external interrupts, equal to $k_i'k_c$ and thus, $K_i'k_c - N_f$ will equal zero and $N_i$ will be relatively unchanged in step 506.

After computing the correction variable $N_i$, the number of pulses counted $N_f$ is set equal to zero, step 508, thereby readying this variable for another internal interrupt. To keep the correction variable $N_i$ within certain limits, it is compared to an upper limit saturation variable $S_h$ and, if $N_i$ is greater than $S_h$, the value of the correction variable will be set equal to the upper limit saturation variable, step 512, thereby providing an upper limit saturation value to the number of pulses to be added to the first oscillating signal. Likewise, correction variable $N_i$ is compared to a lower limit saturation variable $S_l$, step 514, and if $N_i$ is less than $S_l$, the correction variable is set equal to the value of the lower limit saturation variable, step 516, thereby providing a lower limit saturation value to the number of pulses which will be added to the first oscillating signal. In the preferred embodiment, the upper limit saturation variable $S_h$ is chosen to equal 255 and the lower limit saturation variable $S_l$ is chosen to equal 10.

The microprocessor then moves to step 518 which represents the end of the external interrupt process. Thus, during each external interrupt, the microprocessor determines how many $N_f$ pulses were counted since the last external interrupt, and a new value for the correction variable is computed.

Figure 6:
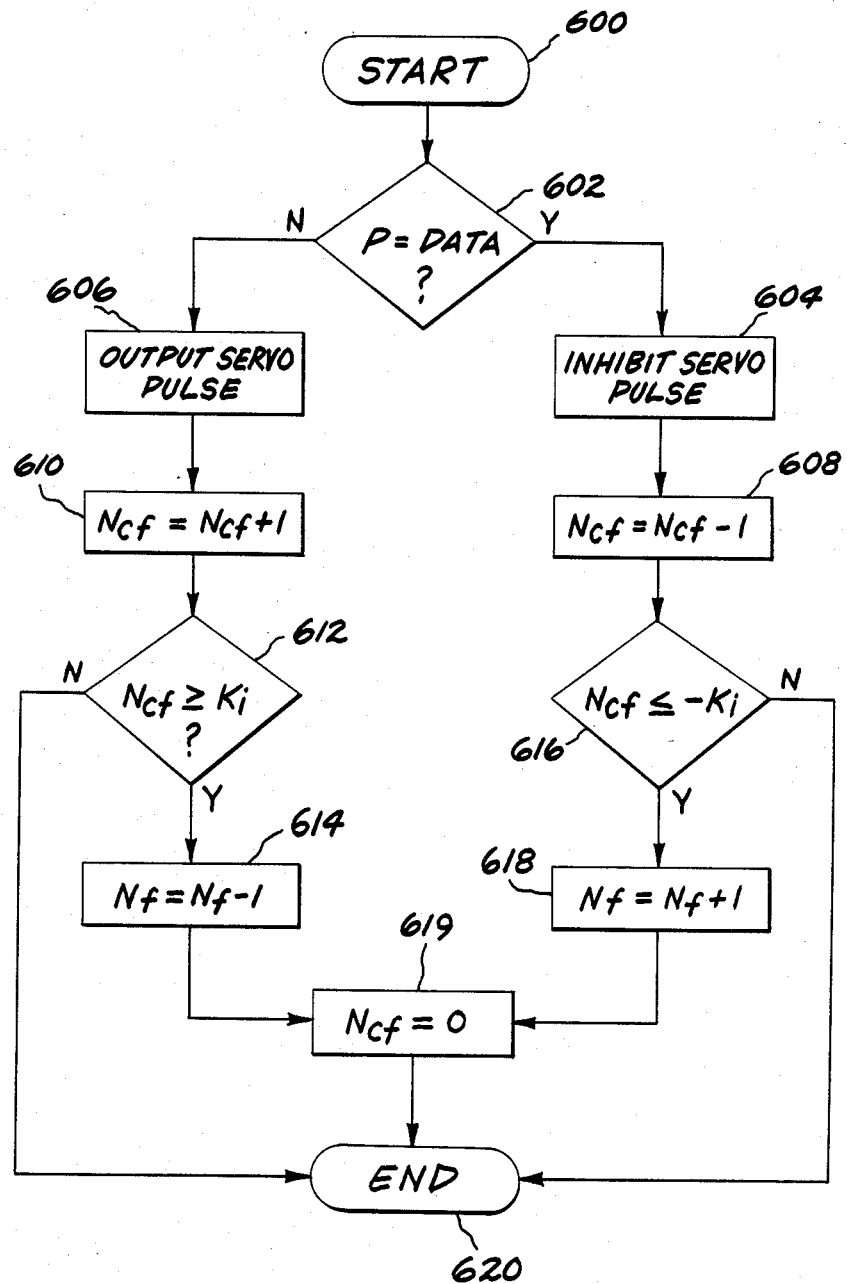
FIG. 6 is a decisional flow diagram illustrating several steps of the method taken to correct the phase of the local oscillator signal.

With reference to FIG. 6, there shown a decisional flow diagram to illustrate the process by which the phase of the local oscillator signal is corrected. As discussed above, this routine is initiated during state 1 as indexed by the state counter during each internal interrupt. After beginning the routine in step 600, the local oscillator phase deviation signal from filter 206 is compared to the data signal from filter 204. Where the data signal and the local oscillator phase deviation signal are both one or both zero, the local oscillator signal leads the received carrier, as described above, and microprocessor 108 moves to step 604. Conversely, where one signal is one and the other is not, the local oscillator signal lags the received carrier signal and the microprocessor moves to step 606.

Looking to the right half of the decisional flow diagram of FIG. 6, a local oscillator servo pulse is inhibited thereby retarding the phase of the local oscillator signal, step 604. Similarly, along the left half of the decisional flow diagram, a servo pulse is added thereby advancing the phase of the local oscillator, step 606. As discussed above, by dividing the first oscillating signal by a large multiple $k_i$, a capability for fine phase adjustment is provided such that one pulse will adjust the phase very slightly.

The number of phase correction pulses inhibited and added to the output servo pulse are accumulated in a variable $N_{cf}$, which represents a phase correction pulse counter. If a pulse is inhibited in step 604, this variable is decremented by one, step 608. Likewise, if a pulse is added to the output servo signal in step 606, this variable is increased by one, step 610. When the number of pulses incremented equals or exceeds the value of $k_i$, the number of second oscillating pulses counted is decremented by one such that the steps taken to adjust the local oscillator phase will not cause the microprocessor to decrease the local oscillator frequency. To this end, the phase correction variable is compared to the first integral multiple $k_i$, the step 612, and if it is greater than or equal to $k_i$, the number of pulses counted is decremented by one, step 614. Likewise, the number of phase correction pulses $N_{cf}$ is compared to the negative of the first integral multiple $k_i$, step 616, and if the number of phase correction pulses is less than or equal to this value, the number of pulses counted $N_f$ is incremented by one, step 618. It will be noted that, where one pulses is added during one cycle and a pulse is subtracted during the next cycle, the net change of the phase correction variable $N_{cf}$ is zero and thus, the number of pulses counted $N_f$ will not be adjusted. Where the number of pulses counted $N_f$ is adjusted, the number of phase correction pulses is set equal to zero, step 619, and the local oscillator frequency phase adjustment process is ended, step 620.

Figure 7:
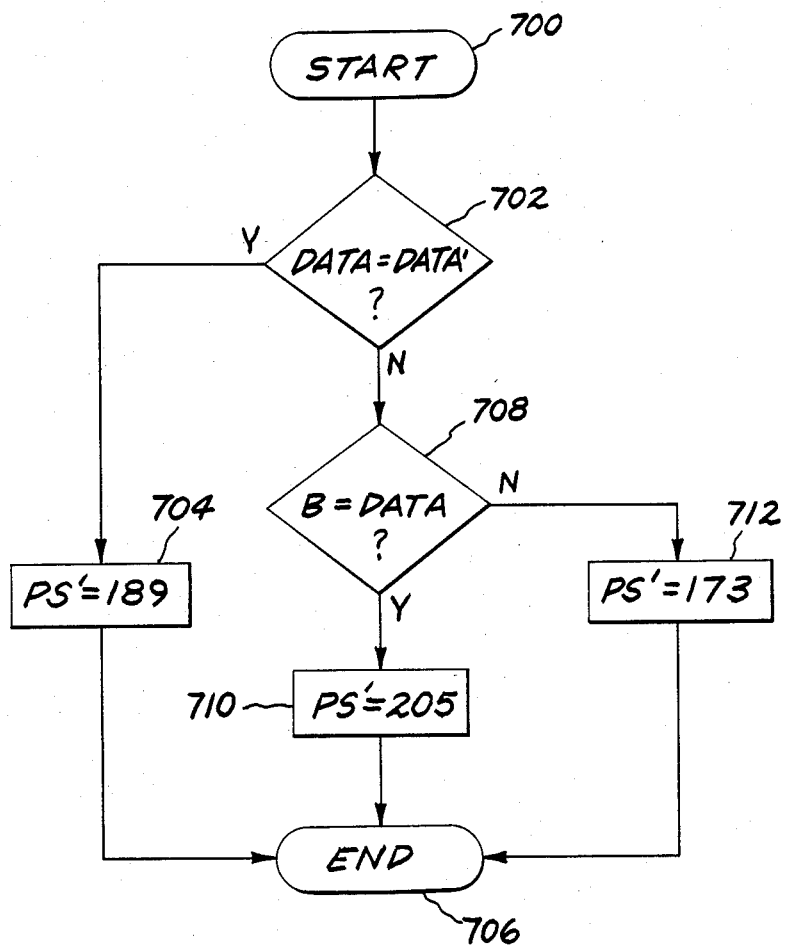
FIG. 7 is a decisional flow diagram illustrating several steps of the method taken to correct the baud period.

With reference to FIG. 7, there is shown a decisional flow diagram for adjusting the local baud phase in accordance with the method of the present invention. This process is initiated during the second state of the internal interrupt routine as discussed hereinabove. After initiation, step 700, the data signal during this baud period DATA is compared with the state of the data signal during the preceding baud period DATA' for equality, step 702. Where the signals are the same for the two periods, the data has not undergone a transition and the output of filter 208 (FIG. 2) will not be indicative of the local baud phase deviation. Therefore, the next preset value PS' is set equal to the nominal value 189, step 704, and the baud phase adjustment routine is ended, step 706.

Where, however, the data has changed value, the output of filter 208 will be indicative of the baud phase and the necessary correction can be made. The baud phase deviation signal is compared with the data signal DATA of this period, step 708, to determine whether the local baud period leads or lags the received baud. As discussed above, where the baud phase deviation signal and the data signal are both one or both zero, the local baud leads the received baud and the preset value of the next state is set to 205, step 710. Conversely, where one signal is one and the other is not, the local baud lags the received baud and the preset value for the next state is set to 173, step 712.

It will be noted that by setting the preset variable to a value higher than the nominal value, to wit 205, less pulses will be counted during the next internal interrupt period thereby indexing the state counter sooner and, hence, moving forward in time the baud period. Conversely, where the preset value is set at a value lower than the nominal value, to wit 173, the number of pulses counted in the next internal interrupt period is increased, thereby delaying the time at which state 0 will occur and, hence, retarding in time the baud period.

Thus, method and apparatus have been described for providing a phase shift demodulator wherein a microprocessor is advantageously used to provide the necessary local oscillator and baud signals. It will be readily appreciated, by one skilled in the art, that while only certain embodiments have been described hereinabove, many modifications and changes may be made without departing from the true spirit and scope of the invention. The appended claims, therefore, are intended to cover all such modifications and changes.

What I claim is:

1. Apparatus for providing a local oscillator signal with a frequency which is at all times equal to a constant multiple of the frequency of a reference waveform, comprising:

means, responsive to said reference waveform, for providing an interrupt signal upon the occurrence of a predetermined point in each cycle of said reference; and digital processing means for providing said local oscillator signal, said digital processing means being responsive to said interrupt signal for determining the number of pulses of said local oscillator signal provided during one cycle of said reference waveform and for modulating the frequency of said local oscillator such that the number of local oscillator pulses provided during one cycle of said reference waveform is maintained to substantially equal said constant, said digital processing means comprising a microprocessor adapted to provide said local oscillator signal, and responsive to said interrupt signal for determining the number of local oscillator pulses provided during one cycle of said reference and for modulating the number of local oscillator pulses provided to maintain this number to substantially equal said constant.

2. Apparatus, as recited in claim 1, wherein said digital processing means comprises:

means for adding a plurality of servo pulses to the pulses of a first oscillating signal to provide said local oscillator; and a microprocessor for providing said first oscillating signal and said servo pulses, said microprocessor being responsive to said interrupt means for determining the number of pulses of said local oscillator during one cycle of said reference and for modulating the number of servo pulses provided such that the number of local oscillator pulses provided during each cycle of said reference is maintained to equal said constant multiple.

3. Apparatus, as recited in claim 2, wherein said adding means comprises a digital counter.

4. Apparatus for synchronizing a local oscillator signal to the phase and frequency of a carrier signal wherein the instantaneous frequency of said carrier is a constant first multiple of the instantaneous frequency of a reference waveform, said apparatus comprising:

means, responsive to said reference waveform, for providing an interrupt signal upon the occurrence of a predetermined point in each cycle of said waveform;

means for detecting the phase of said local oscillator relative to said carrier; and digital processing means, responsive to said interrupt means, for providing said local oscillator signal and for maintaining the frequency of said local oscillator signal to be a constant multiple of the frequency of said reference by determining the number of local oscillator pulses provided between occurrences of said interrupt signal and maintaining this number to substantially equal said constant, said digital processing means also being responsive to said detector means to determine whether said oscillator signal leads or lags said carrier and, thereafter, to advance a lagging local oscillator and retard a leading local oscillator.

5. Apparatus, as recited in claim 4, wherein said digital processing means comprises a microprocessor for providing said local oscillator signal and for maintaining the frequency of said local oscillator to be a constant multiple of said instantaneous frequency of said reference by determining the number of local oscillator pulses provided during one cycle of said reference and modulating this number to substantially equal said constant.

6. Apparatus as recited in claim 4, wherein said digital processing means comprises:

means for adding a plurality of servo pulses to the pulses of a first oscillating signal to provide a composite signal, said adding means being further adapted to divide the frequency of said composite signal by a second multiple to provide said local oscillator signal; and a microprocessor for providing said first oscillating signal and said servo pulses, said microprocessor being responsive to said interrupt means for determining the number of pulses of said composite signal during each cycle of said reference and for modulating the number of servo pulses provided such that the number of composite pulses provided during each cycle of said reference is maintained to equal the arithmetic sum of said first multiple and said second multiple, said microprocessor also being responsive to said detector means for determining whether said local oscillator leads or lags said carrier and for advancing a lagging local oscillator by providing one additional servo pulse and, conversely retarding a leading local oscillator by inhibiting one servo pulse.

7. Apparatus as recited in claim 6 wherein said microprocessor is further adapted to maintain independence between the frequency correction and the phase correction functions by adjusting the number of composite pulses determined to be provided during each cycle such that this number does not reflect the number of servo pulses added or inhibited to correct the phase of said local oscillator during said cycle.

8. A method for providing a local oscillator signal which is in phase and frequency synchronism with a carrier signal, wherein the frequency of said carrier signal is a first multiple of the frequency of a reference waveform, and wherein said reference waveform is known to have a lower limit frequency giving rise to a lower limit carrier frequency, said method comprising the steps of:

(a) providing a first oscillating signal of frequency equal to a second multiple of said lower limit carrier frequency;

(b) adding a number of servo pulses to said first oscillating signal to provide a composite signal;

(c) dividing the frequency of said composite signal by said second multiple to provide said local oscillator signal;

(d) periodically determining the number of said composite signal pulses during each cycle of said reference waveform;

(e) modulating the number of said servo pulses to be added to said first oscillating signal based on determination of step (d) such that the number of composite signal pulses provided during each cycle of said reference is regulated to equal the arithmetic sum of said first multiple and said second multiple;

(f) periodically determining whether said local oscillator leads said carrier signal and, if so, inhibiting one said servo pulse from being added to said first oscillating signal; and (g) periodically determining whether said local oscillator lags said carrier signal and, if so, adding one additional said servo pulses to said first oscillating signal.

9. The method as recited in claim 8 further including the step of compensating the number of said composite signal pulses determined to be provided in any said cycle such that any said servo pulses inhibited in said cycle are included in said number and further, such that any additional servo pulses added in said cycle are not included in said number thereby maintaining independence between the frequency and phase compensation.

* * * * *